US 8,244,669 B2

United States Patent
Ellis et al.

(12) United States Patent
(10) Patent No.: US 8,244,669 B2
(45) Date of Patent: Aug. 14, 2012

(54) DYNAMIC FORMATION OF GROUPS IN A NOTIFICATION SYSTEM

(75) Inventors: Deanna Ellis, Pasadena, CA (US); Bing Chen, Glendale, CA (US)

(73) Assignee: Blackboard Connect Inc., Washington, DC (US)

( * ) Notice: Subject to any disclaimer, the term of this patent is extended or adjusted under 35 U.S.C. 154(b) by 622 days.

(21) Appl. No.: 12/346,748

(22) Filed: Dec. 30, 2008

(65) Prior Publication Data

US 2010/0169344 A1 Jul. 1, 2010

(51) Int. Cl.
*G06F 17/30* (2006.01)

(52) U.S. Cl. ........ 707/609; 707/613; 707/623; 709/223; 709/226

(58) Field of Classification Search .......... 707/623–625; 709/223–226
See application file for complete search history.

(56) References Cited

U.S. PATENT DOCUMENTS

| | | | |
|---|---|---|---|
| 6,442,250 B1 * | 8/2002 | Troen-Krasnow et al. | 379/93.15 |
| 7,113,979 B1 * | 9/2006 | Smith et al. | 709/217 |
| 7,552,185 B1 * | 6/2009 | Kirzner et al. | 709/206 |
| 7,890,124 B2 * | 2/2011 | Smith et al. | 455/456.3 |
| 8,045,455 B1 * | 10/2011 | Agronow et al. | 370/229 |
| 8,069,202 B1 * | 11/2011 | Cona et al. | 709/200 |
| 2002/0087646 A1 * | 7/2002 | Hickey et al. | 709/206 |
| 2002/0138582 A1 | 9/2002 | Chandra et al. | |
| 2002/0194490 A1 * | 12/2002 | Halperin et al. | 713/200 |
| 2003/0051026 A1 * | 3/2003 | Carter et al. | 709/224 |
| 2003/0109247 A1 * | 6/2003 | Lindgren et al. | 455/412 |
| 2004/0111612 A1 | 6/2004 | Choi et al. | |
| 2004/0133646 A1 * | 7/2004 | Leukert-Knapp et al. | 709/206 |
| 2005/0027791 A1 * | 2/2005 | Bos et al. | 709/200 |
| 2005/0050099 A1 * | 3/2005 | Bleistein et al. | 707/104.1 |
| 2005/0198170 A1 | 9/2005 | LeMay et al. | |
| 2006/0059287 A1 * | 3/2006 | Rivard et al. | 710/300 |
| 2007/0041377 A1 * | 2/2007 | Song et al. | 370/389 |
| 2007/0118549 A1 * | 5/2007 | Bornhoevd et al. | 707/101 |
| 2007/0118560 A1 * | 5/2007 | Bornhoevd et al. | 707/104.1 |
| 2007/0124188 A1 * | 5/2007 | Herman et al. | 705/8 |
| 2007/0130208 A1 * | 6/2007 | Bornhoevd et al. | 707/104.1 |
| 2007/0150496 A1 | 6/2007 | Feinsmith | |
| 2007/0243880 A1 * | 10/2007 | Gits et al. | 455/456.1 |
| 2008/0077461 A1 * | 3/2008 | Glick | 705/7 |
| 2008/0114847 A1 * | 5/2008 | Ma et al. | 709/206 |
| 2008/0228857 A1 * | 9/2008 | Ostertag et al. | 709/201 |
| 2008/0270906 A1 * | 10/2008 | Reddy | 715/733 |
| 2009/0112985 A1 * | 4/2009 | Quinn et al. | 709/204 |
| 2009/0165090 A1 * | 6/2009 | Glasgow | 726/3 |
| 2009/0248799 A1 * | 10/2009 | Gavita | 709/204 |

* cited by examiner

*Primary Examiner* — Hanh Thai
(74) *Attorney, Agent, or Firm* — McDermott Will & Emery LLP

(57) ABSTRACT

A method for determining membership in a group of notification recipients and issuing a notification to the group of notification recipients, is disclosed. The method includes associating a set of potential recipients of notifications with at least one descriptor and dynamically forming a group of recipients to receive at least one notification based on the descriptors currently associated with the set of potential recipients of notifications. The method also includes issuing the at least one notification to the group of recipients. A system for determining membership in a group of notification recipients and issuing a notification to the group of notification recipients, is also provided.

21 Claims, 5 Drawing Sheets

Filters: Use this area to narrow down your list of contacts.

Type: [Select criteria... ▼]  Gender: [Select criteria... ▼]  Site: [Select criteria... ▼]

Language: [Select criteria... ▼]  Grade: [Select criteria... ▼]  Group: [Select criteria... ▼]

401

You have selected:
Student or Admin
who speak English-ENG or Spanish
who are Male
that are in Grade 1 or 3 or 6
belonging to Site: BALD EAGLE INTERMEDIATE SCHOOL or JASON HIGH SCHOOL
belonging to Groups: AM - Bus 446

402

| Type | Name ▲ | Select | Type | Name ▲ | Select | Type | Name ▲ | Select |
|---|---|---|---|---|---|---|---|---|
| & | Abbattista, Joanna | ☐ | & | Adderley, Jacob | ☐ | & | Akers, Ann | ☐ |
| & | Abbott, Bethany | ☐ | & | Addington, Ashley | ☐ | & | Alberring, Dustin | ☐ |
| & | Abdullah, Sadiyah | ☐ | & | Addington, Kathryn | ☐ | & | Alberson, Amanda | ☐ |

DYNAMIC FORMATION OF GROUPS IN A NOTIFICATION SYSTEM

BACKGROUND

1. Field

The present disclosure relates to transmission of notifications, and more particularly, to methods and systems for the dynamic formation of groups in a notification system.

2. Background

Businesses and governmental entities, including municipalities and schools, are ever more reliant on communicating through the mass transmission of notifications to their staff, citizens and family members of students to keep these constituencies apprized of important events, and sometimes of emergencies. For example, a school principal might need to send a message to the parent of every child that the school will be closed the next day due to some unforeseen event such as flooding, fire, or freezing conditions. Notifications with such messages might be sent by telephones, facsimiles, pagers, electronic mail (e-mail), and/or text messages. These notifications will typically vary in their degree of importance, in the number of recipients, or in the immediacy with which they must be sent.

However, there currently exists a growing problem as mass notification transmission systems become more prevalent. In particular, the number of potential recipients capable of receiving various notifications is consistently increasing. Furthermore, it is difficult to identify the appropriate recipients for notifications since the groups of recipients are constantly changing. For example, if a notification is intended to be received by recipients living within a certain geographical area, it may be difficult to identify and select every intended recipient living in that area as people are moving into and out of an area. As another example, if a Spanish language notification is intended to be received by parents or guardians of every third grade student at a particular school who primarily speak Spanish, it would be both difficult to identify recipients that meet these criteria, and inefficient to individually select such recipients.

In such situations, intended recipients will have to be individually identified and individually selected, often amongst a large number of potential recipients. It would be desirable to select these intended recipients in a uniform and efficient manner.

SUMMARY

There is a need for an appropriate notification system that dynamically identifies and selects a group of potential recipients for a notification that are associated with a single or multiple descriptors. Embodiments of the disclosed systems and methods address this and other needs.

The present disclosure describes systems and methods whereby membership in a group of notification recipients is dynamically determined for receipt of a notification.

In certain aspects of the disclosure, a method for determining membership in a group of notification recipients and issuing a notification to the group of notification recipients, is provided. The method includes associating a set of potential recipients of notifications with at least one descriptor and dynamically forming a group of recipients to receive at least one notification based on the descriptors currently associated with the set of potential recipients of notifications. The method also includes issuing the at least one notification to the group of recipients.

In a further aspect of the disclosure, a system for determining membership in a group of notification recipients and issuing a notification to the group of notification recipients, is provided. The system includes a recipient module configured to store information regarding a set of potential recipients of notifications, and a tagging module configured to associate the potential recipients with at least one descriptor. The system also includes a grouping module configured to dynamically form a group of recipients to receive at least one notification based on the descriptors currently associated with the set of potential recipients of notifications. The system further includes a transmission module configured to transmit the at least one notification to the group of recipients.

In another aspect of the disclosure, a system for determining membership in a group of notification recipients and issuing a notification to the group of notification recipients, is provided. The system includes a recipient module configured to store information regarding a set of potential recipients of notifications, and a tagging module configured to associate the potential recipients with at least one descriptor. The system also includes a grouping module configured to automatically update, in response to a change in the descriptors associated with the set of potential recipients of notifications, a group of recipients to receive at least one notification based on the descriptors currently associated with the set of potential recipients of notifications. The system further includes a transmission module configured to transmit the at least one notification to the group of recipients.

In yet a further aspect of the disclosure, a machine-readable medium encoded with instructions for determining membership in a group of notification recipients and issuing a notification to the group of notification recipients, is provided. The instructions include associating a set of potential recipients of notifications with at least one descriptor, and dynamically forming a group of recipients to receive at least one notification based on the descriptors currently associated with the set of potential recipients of notifications. The instructions also include issuing the at least one notification to the group of recipients.

In yet another aspect of the disclosure, a system for determining membership in a group of notification recipients and issuing a notification to the group of notification recipients, is provided. The system includes means for associating a set of potential recipients of notifications with at least one descriptor, and means for dynamically forming a group of recipients to receive at least one notification based on the descriptors currently associated with the set of potential recipients of notifications. The system also includes means for issuing the at least one notification to the group of recipients.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

FIG. 4 is a sample interface for dynamically selecting a group of recipients for notifications.

DETAILED DESCRIPTION

There is a problem in mass notification systems of dynamically identifying and selecting a group of recipients that meet a single criterion or multiple criteria (e.g., recipients that are associated with a single or multiple descriptors). This and other problems are addressed and solved, at least in part, by embodiments of the present disclosure which include a system for determining membership in a group of notification recipients and issuing a notification to the group of notification recipients. The system includes a recipient module configured to store information regarding a set of potential recipients of notifications, and a tagging module configured to associate the potential recipients with at least one descriptor. The system also includes a grouping module configured to dynamically form a group of recipients to receive at least one notification based on the descriptors currently associated with the set of potential recipients of notifications. The system further includes a transmission module configured to transmit the at least one notification to the group of recipients.

With reference to the drawings, which are provided by way of exemplification and not limitation, there are disclosed embodiments for disseminating a mass of outgoing digital notifications to a selected group, or groups, of recipients by way of various communication methods. More specifically, the dynamic selection of recipients, for a notification, having certain descriptors is disclosed. As discussed herein, the term "dynamic" reflects the occurrence of an action in real-time or near real-time. Dynamic also refers to the automatic updating of groups based upon changes in the characteristics of a potential pool of recipients. As also discussed herein, a "descriptor" is an attribute that can be associated with a recipient, e.g., the descriptor "$2^{nd}$ grade" is an attribute that may be associated with a recipient who has a child in the second grade. A descriptor can be an attribute associated with the person or persons the notification concerns (e.g., a student who is a minor), or the descriptor can be an attribute associated with a person associated with or responsible for the person whom the notification concerns (e.g., a parent or guardian of the student who is a minor). A descriptor can be user-defined. In certain embodiments, a descriptor can be predefined. A descriptor can be any attribute selected to be associated with one recipient or a number of recipients, such as, by way of example only, gender, grade level, geographical location, educational institution, language, age, a physical characteristic, an academic characteristic, employment characteristic, political characteristic, performance information, or course information.

Figure 1:
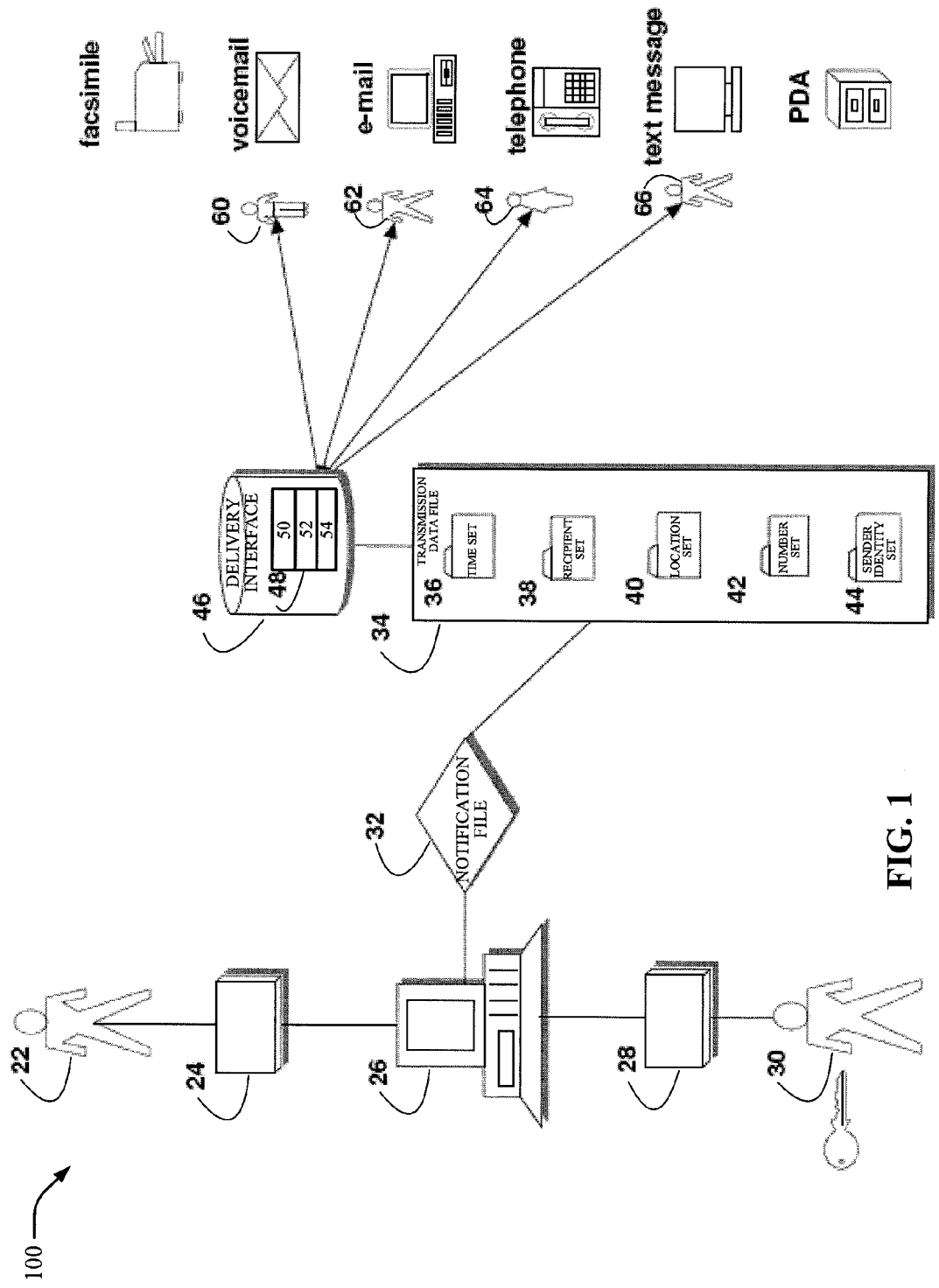
FIG. 1 is a diagram illustrating an example of a mass notification transmission system.

FIG. 1 is a diagram illustrating an example of a mass notification transmission system. For the following description, only one group of recipients is initially described in order to explain how a single notification is processed. However, the present disclosure will also describe the use of subgroups of a group of recipients. Furthermore, for the following description, groups of recipients are discussed as being formed dynamically during the process of selecting and sending a notification. However, recipients may stored in a database according to groups and thereafter be updated automatically at any time, e.g., at a time outside of the process of selecting and sending a notification. Namely, if a newly added potential recipient is associated with a certain descriptor that is common to an already existing group of recipients in the database, the group of recipients is automatically updated to include the newly added potential recipient and the changes are stored. Similarly, the group of recipients is automatically updated to remove a potential recipient in the system that is no longer associated with a descriptor for the existing group of recipients.

For example, if a database contains a group of recipients who are associated with a descriptor indicative of speaking Spanish as a primary language, and a new student is added to the database and associated with the descriptor indicative of speaking Spanish as a primary language, then the group of recipients is automatically updated to include the new student.

As another example, the database of the mass notification transmission system may be coupled to and share a database with a course management system, such as the course management system described in U.S. Pat. No. 6,988,138. The shared database can include information both on the performance of students within the course management system and contact information for potential recipients of notifications associated with those students, such as those students' parents. In one embodiment, if the shared database contains a group of recipients who are associated with a descriptor indicative of performance or other course information, such as students receiving a failing grade in a course, and if the course management system indicates a student has received a failing grade, then the group of recipients associated with the descriptor indicative of a failing grade will be automatically updated to include the student.

As can be seen in FIG. 1, a computer system 26 forms a core component of the system. The computer system 26 is preconfigured to receive a notification from a user 22 of the system who may wish to act as an initiator by sending that notification to a large number of recipients 60, 62, 64, and 66. The user 22 will have normally acquired the right to send a notification into the computer system 26 by earlier entering into a contract with the management of the system, entering the user's name on a list of legitimate users, paying the required fee if appropriate, and acquiring an entry code for authorization. The notification the user 22 sends to the computer system 26 may be sent in any one of a number of different formats via a transmission interface 24 (i.e., a transmissions module). It should be noted that a system administrator 30 may also send a notification via a different transmission interface 28. For example, the transmission interface 24 and/or 28 may be an ordinary land telephone, a radio transmitter, a cell phone, a computer for sending email, a computer with an internet connection, or it may be a facsimile machine for sending faxes, or the like.

Using the example discussed above, a message included in a notification might be: "Please clear your brush before fire season." The selected recipients might be a group of residents who live within a fire zone. The time and date to send might be "7:00 PM" and "tonight," and the methods of transmission to recipients selected by the user might include telephone and e-mail delivery. These choices are exemplary only.

Once the notification is received by the computer system 26 from the user 22, it is stored by the computer system 26 as a notification file 32 in a local or remote memory associated with the computer system 26. The notification file 32 that includes the message may be associated with a transmission data file 34 for later use, as set forth more fully below. If the notification received is an ordinary voice notification via an interface 24 which is a telephone, the analogue voice signal may be converted to a digital sound file such as a .wav file and stored by the computer system 26 as such. If the notification received via the interface 24 is an email, it may be stored by the computer system 26 as a .txt file, but it may also be converted to a sound file using text-to-speech (TTS) software. If the notification is received as a facsimile, it may be stored by the computer system 26 in a database or memory as a .pdf file. Such file formats are exemplary only. All of these notifications are stored pending distribution to the appropriate recipients in the appropriate form.

Once the notification file 32 is stored by the computer system 26, the notification file 26 is associated with the transmission data file 34 that is structured to include one or more of a number of data sets 36-44 that will later assist in controlling the transmission of the notification file 32. For example, the user 22 may insert information into the data sets 36-44 by entering keystrokes (telephone key, computer key, etc.) in response to queries from the computer system 26 as to what information should be entered in the data sets 36-44. The data sets 36-44 will then be associated with the notification file 32, as described.

The data sets 36-44 may comprise the following data sets. A time set 36 contains information relating to the time the notification is scheduled for distribution. A recipient set 38 contains information relating to recipients the notification is intended to reach, as will be discussed in further detail below. For example, the recipients may be listed individually or as a group, such as all the parents of students at a school between 6th and 8th grades. A location set 40 contains information relating to the geographical locations the notification is intended to reach. For example, the intended recipients may be all the residents in a town living on one side of a river, or next to a combustible forest. Further data sets may be generated from information provided in preceding sets. For example, a number set 42 may be generated by the computer system 26 from the information entered into the recipient set 38, wherein the computer system 26 calculates the number of intended recipients of the notification, and enters that number into the number set 42 for later use.

A sender identity set 44 may contain the identity of the user 22 who created the notification, and information relating to the status and rights of that user 22. The status and rights of the user 22 would be obtained based on the code entered by the user 22 to access the computer system 26 in order to initiate the notification. For example, the user identity set 44 may indicate that the user 22 is the principal of a school who would legitimately want to reach a large audience of parents of students at the school. Alternatively, the user identity set 44 may indicate that the user is a teacher of 8th grade, who would typically want to reach only the parents of students in her 8th grade class, or perhaps all the 8th grade students in the school, but whose legitimate interest would not include communicating with the parents of all the students at a school.

As noted above, the notification 32 may be created in a plurality of formats (e.g., .wav, .txt, or .pdf). For example, the notification 32 may be created in at least one format, based on whether the notification is received via interface 24 as a voice notification, an email, or a facsimile. Once the notification 32 is created in the appropriate plurality of formats (e.g., .wav, .txt, or .pdf) and is associated with the transmission data file 34 with its data sets, the computer system 26 stores the notification and associated data file in a delivery interface 46. The delivery interface 46 is configured to hold the notification in storage 48 until a triggering event occurs, as more fully described below.

According to an embodiment of the disclosure, delivery interface 46 may include storage unit 48, which may store information including notification data 50, sender data 52, and recipient data 54. For example, in the context of school, storage unit 48 may be configured to include at least the following fields for each student: "Parent Name," "Student Name," "User 1," and "Message 1." To obtain information referred to by fields of transmission data file 34, delivery interface 46 may access the appropriate data from storage unit 48. For example, if recipient set 38 identifies the recipients as all parents of students at a school between 6th and 8th grades, the parent contact information for all 6th and 8th grade students can be accessed from storage unit 48. It should be noted that the storing of notification data 50, sender data 52 and recipient data 54 is not limited to storage unit 48, and that this data may be stored elsewhere in computer system 26 or in other external systems.

Within the delivery interface 46 in the computer system 26, each recipient of the notification 32 has already been associated with a form of transmission according to a prior request made by each potential recipient to the management of the system. Thus, for example, recipient 60 may have requested to be associated with a form of transmission by facsimile, recipient 62 may be associated with a form of transmission by voicemail, recipient 64 may be associated with a form of transmission by e-mail, recipient 66 may be associated with a means of transmission by text message, or pager, and so on. Thus, the computer system 26 is configured to transmit the notification 32 in appropriate format (e.g. .wav, .txt, .pdf) to each recipient, according to a known method. In certain embodiments, a means of transmission may be associated with the recipient based on a selection made by the user 22. For example, a user 22 may choose to associate a recipient with voicemail if the notification 32 is urgent. In certain embodiments, a means of transmission may be automatically associated with the recipient based on the content of the notification 32. For example, if the notification 32 includes an image, then means of transmission may be facsimile or email.

When a triggering event occurs, the delivery interface 46 causes one or many notifications 32 (having been delivered to the computer system 26 by an enabled user 22 possessing an appropriate access code) to be distributed, according to known methods, to a mass of recipients, e.g. recipients 60-66 of FIG. 1, identified by the user 22. Such notifications 32 may be combined with numerous similar notifications (e.g., in a notification batch) for mass transmission at approximately the same time. This capability of the system places power in the hands of an institution or group of people to keep classes of citizens informed of events that are directly relevant to them on a real time basis.

Considering further aspects of the disclosed systems and methods, an exemplary problem that may be encountered will now be described. A notification may be intended for recipients who are associated with certain descriptors, i.e., a group of selected recipients. Such a group may include a few recipients or a large number of recipients. For example, five hundred recipients in a district may be associated with two descriptors indicative of a (a) high school student (b) enrolled in chemistry, respectively. A user who selects to send a notification to these recipients, such as a notification including the message "Chemistry class is canceled today," would usually be required to examine each recipient from a list of potential recipients to determine if the recipient is associated with these descriptors, (e.g., if the recipient was a high school student enrolled in chemistry), and then individually select each recipient associated with the descriptors. This is an undesirable situation, especially if there are either a large number of potential recipients to evaluate, there are multiple descriptors to be evaluated, and/or a large number of potential recipients associated with the descriptors. In a mass notification transmission system such as the one illustrated in FIG. 1, it may be desirable for recipients associated with the descriptors to be automatically identified and dynamically grouped together. Returning to the previous example, accordingly to the present disclosure, each potential recipient who is (a) a high school student (b) enrolled in chemistry would automatically be identified and dynamically grouped together. Thus, an efficient method and system for dynamically forming groups of recipients is provided.

Figure 2:
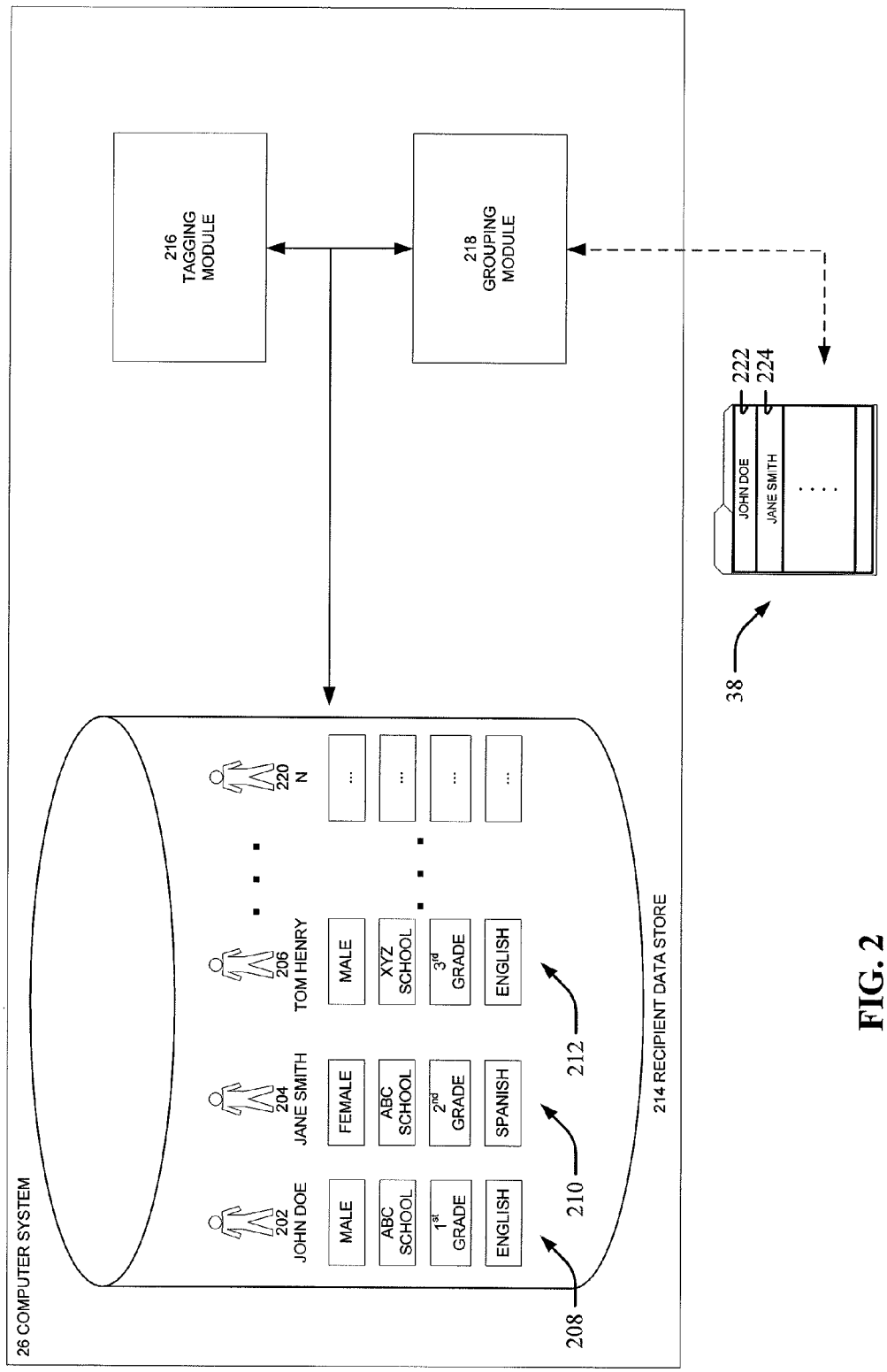
FIG. 2 is a diagram illustrating the computer system of FIG. 1.

FIG. 2 is a diagram illustrating a dynamic grouping system including the computer system 26 of FIG. 1. As can be seen in FIG. 2, computer system 26 includes a recipient data store 214, a tagging module 216, and a grouping module 218.

Tagging module 216 is configured to associate descriptors with potential recipients of notifications. Descriptors can be associated with potential recipients by tagging module 216 using methods known to those with skill in the art, such as, for example, metadata tags. For example, as illustrated with respect to the recipient data store 214, a data structure indicative of a potential recipient, John Doe 202, can be associated by the tagging module 208 with the descriptors "male," "ABC School," "1$^{st}$ Grade," and "English" 208. A data structure indicative of another potential recipient, Jane Smith 204, can be associated by the tagging module 208 with the descriptors "female," "ABC School," "2$^{nd}$ Grade," and "Spanish" 210. A data structure indicative of yet another potential recipient, Tom Henry 206, can be associated by the tagging module 208 with the descriptors "male," "XYZ School," "3$^{rd}$ Grade," and "English" 212.

The recipient data store 214 may be any type of memory or database that includes information regarding potential recipients for notifications. For example, recipient data store 214 includes information on N potential recipients, from information on John Doe 202, Jane Smith 204, Tom Henry 206, to information on an N$^{th}$ recipient 220. The recipient data store 214 further contains descriptors that can be associated with potential recipients, as discussed above. In certain embodiments, both the information regarding potential recipients 202, 204, 206, and 220 and the descriptors 208, 210, and 212 can be edited, added, or removed.

Grouping module 218 is configured to dynamically form a group of recipients to receive notifications based on the descriptors currently associated with the set of potential recipients of notifications, such that membership in the group of recipients is changeable in response to a change in the descriptors associated with the set of potential recipients of notifications. Using selected descriptors as input, grouping module 218 is configured to identify potential recipients associated with the selected descriptors. Grouping module 218 is also configured to form a group using the identified potential recipients. In certain embodiments, grouping module 218 dynamically forms groups on the fly, e.g., when descriptors are selected, and information regarding recipients included in the group is not stored. In certain other embodiments, groups created by grouping module 218 may be stored, such as in a database.

Grouping module 218 is further configured to adjust membership in the group if the selected descriptors change. For example, if grouping module 218 searches recipient data store 214 for potential recipients associated with selected descriptors "Male" and "English," grouping module 218 will form a group including John Doe 202 and Tom Henry 206, each of whom are associated with descriptors "Male" and "English," but not Jane Smith 204, who is not associated with descriptors "Male" and "English." If the selected descriptor "English" is changed to descriptor "ABC School," the group will remove Tom Henry 206, who is not associated with "ABC School," and still include John Doe 202, who is associated with selected descriptors "English" and "ABC School." Alternatively, if a subgroup of recipients associated with indicators "Male," "XYZ School," and "English" is created from the previously discussed group associated with selected descriptors "Male" and "English," then the subgroup will include Tom Henry 206 and not include John Doe 202 because John Doe 202 is not associated with the descriptor "XYZ School."

Groups created by grouping module 218 can be stored in recipient set 38. The recipient set 38 contains information relating to recipients a notification is intended to reach. In the illustrated example, the recipient set 38 lists each intended recipient individually. Intended recipients from a group associated with the descriptor "ABC School" are listed, starting with John Doe 222 and Jane Smith 224.

Figure 3:
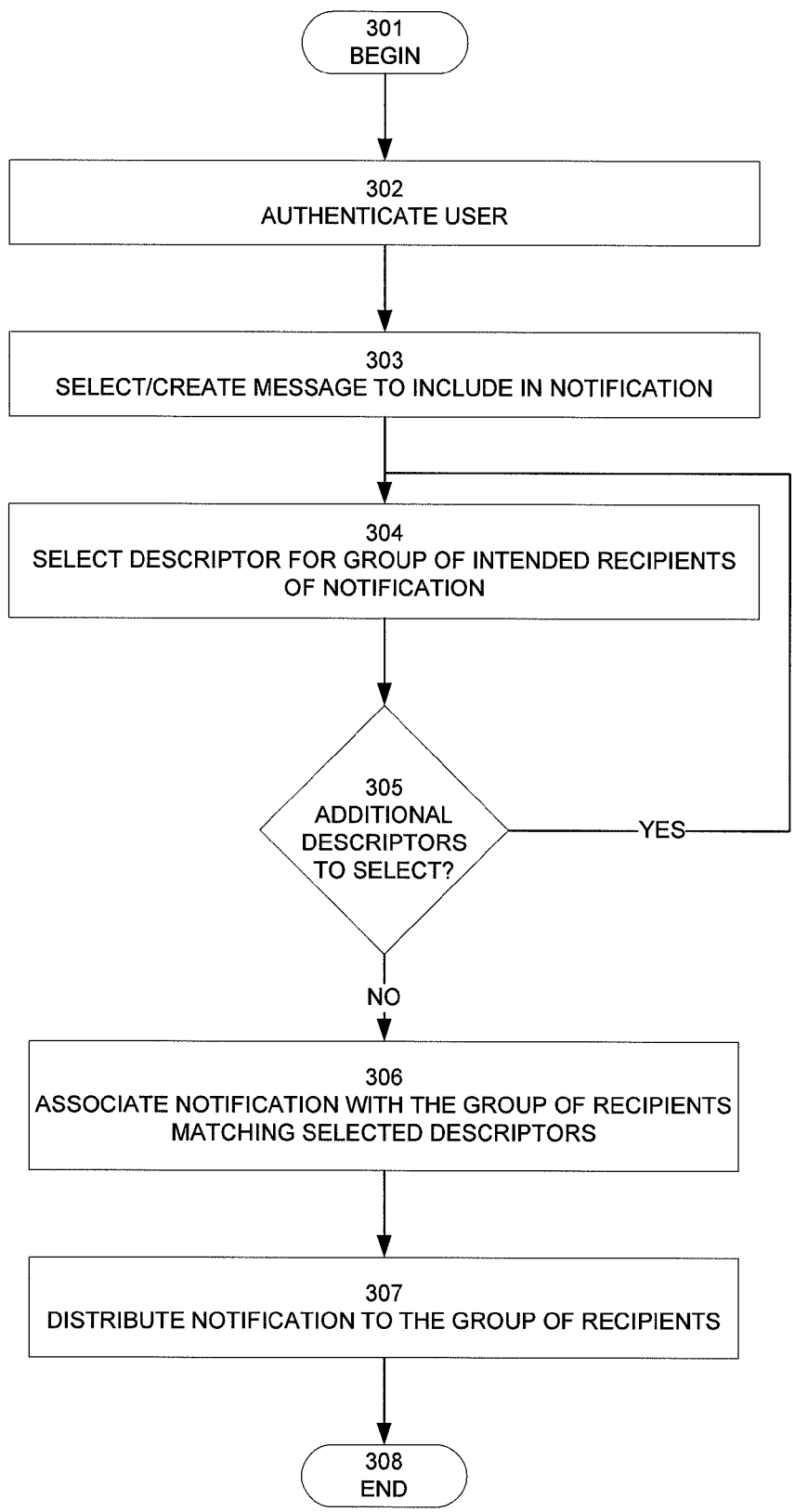
FIG. 3 is a flow chart illustrating an exemplary operation of dynamically forming a group of recipients for notifications.

FIG. 3 is a flow chart illustrating an exemplary operation of dynamically forming a group of recipients for notifications.

The process proceeds from beginning step 301 to step 302 in which a user is authenticated. Authentication may be achieved using methods known to those with skill in the art, such as requiring a username and password. This first step ensures that users of the notification system have appropriate authority to distribute notifications to a mass of recipients, or even a single recipient. Next, in step 303, a message is created and/or selected for distribution in a notification. In step 304, a group of intended recipients of the message is identified from a pool of all potential recipients by selecting those descriptors who meet the criteria of the recipient. One or many descriptors may be selected, and multiple descriptors may be selected consecutively or simultaneously. If, in decision step 305, additional descriptors need to be selected to more appropriately identify the group of intended recipients, then the process returns to step 304 in which another descriptor is selected that is common to all members of the group of intended recipients. After all descriptors have been selected, the process moves to state 306. In certain embodiments, a subgroup of a group of intended recipients can be created, such as for distributing more specific notifications or secondary notifications.

In step 306, the notification is associated with the group of recipients that matches the descriptors selected in step 304. The notification is then distributed to the group of recipients in step 307. In certain embodiments, the group of recipients may be automatically updated based on changes in descriptors through and until the notification is distributed, such as when the notification is scheduled for distribution at a later time. The process ends in step 308.

Having set forth in FIG. 3 a process by which groups are dynamically formed, an example will now be presented using the sample screenshot of FIG. 4 and the process of FIG. 3, where the user is a school principal. FIG. 4 is a sample interface for dynamically selecting a group of recipients for notifications.

The process proceeds for the principal from beginning step 301 to step 302 in which the principal authenticates his identity. Next, in step 303, the principal creates a message, "A field trip for Boys' Physical Education for Grades 1, 3, and 6 will require a special permission slip to be signed by a Parent or Guardian," to send in a notification. In step 304, the principal selects a first descriptor, English-speaking students 402, as illustrated in FIG. 4. The descriptor may be selected using a pull-down menu interface 401. In certain other embodiments, other selection interfaces may be used, such as, but not limited to, lists, checkboxes, and columns. The principal decides in step 305 to select an additional descriptor, so the process returns to step 304, in which the principal selects Spanish-speaking students 402 as an additional descriptor of the intended group of recipients to whom he wants to send the notification. The principal repeats steps 304-405 in order to add further descriptors of recipients who are either students or administrators, male, in grades 1, 3, or 6, from Bald Eagle Intermediate School, and belonging to the group "AM—Bus 446." Selected recipients of the group matching that description may be displayed 403. Descriptors may employ Boolean combinations of descriptors to dynamically form a group. For example, the principal used the Boolean operator "OR" to include recipients associated with descriptors representative of being a student or an administrator. Next, in step 306, the notification including the message "A field trip for Boys' Physical Education for Grades 1, 3, and 6 will require a special permission slip to be signed by a Parent or Guardian," is then associated with the group of intended recipients that share the descriptors selected by the principal. The notification is then sent in step 307, and the process ends in step 308.

Hence, with the present invention, a student moving into the school district with the appropriate characteristics would be automatically part of the dynamically formed group. There is no need to update lists of recipients in a number of different groups that the student would be a part of based on the student's characteristics.

Figure 5:
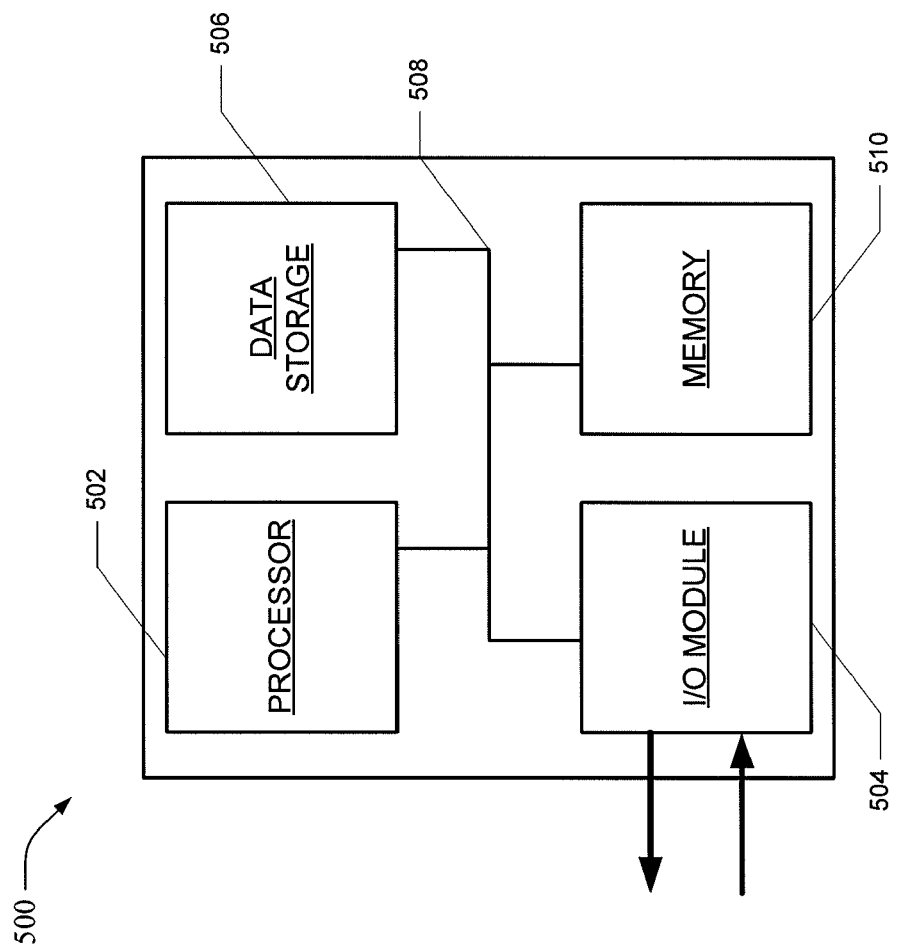
FIG. 5 is a block diagram illustrating an example of a computer system upon which a group of recipients for notifications can be dynamically formed.

FIG. 5 is a block diagram that illustrates a computer system 500 upon which an embodiment of the present disclosure may be implemented in accordance with one aspect of the present disclosure. Computer system 500 includes a bus 508 or other communication mechanism for communicating information, and a processor 502 coupled with bus 508 for processing information. Computer system 500 also includes a memory 510, such as a random access memory ("RAM") or other dynamic storage device, coupled to bus 508 for storing information and instructions to be executed by processor 502. Memory 510 may also be used for storing temporary variable or other intermediate information during execution of instructions to be executed by processor 502. Computer system 500 further includes a data storage device 506, such as a magnetic disk or optical disk, coupled to bus 508 for storing information and instructions.

Computer system 500 may be coupled via I/O module 504 to a display device, such as a cathode ray tube ("CRT") or liquid crystal display ("LCD") for displaying information to a computer user. An input device, such as, for example, a keyboard or a mouse may also be coupled to computer system 500 via I/O module 504 for communicating information and command selections to processor 502.

According to one aspect of the present disclosure, the transmission of notifications may be implemented using a computer system 500 in response to processor 502 executing one or more sequences of one or more instructions contained in memory 510. Such instructions may be read into memory 510 from another machine-readable medium, such as data storage device 506. Execution of the sequences of instructions contained in main memory 510 causes processor 502 to perform the process steps described herein. One or more processors in a multi-processing arrangement may also be employed to execute the sequences of instructions contained in memory 510. In alternative embodiments, hard-wired circuitry may be used in place of or in combination with software instructions to implement various embodiments of the present disclosure. Thus, embodiments of the present disclosure are not limited to any specific combination of hardware circuitry and software.

The term "machine-readable medium" as used herein refers to any medium that participates in providing instructions to processor 502 for execution. Such a medium may take many forms, including, but not limited to, non-volatile media, volatile media, and transmission media. Non-volatile media include, for example, optical or magnetic disks, such as data storage device 506. Volatile media include dynamic memory, such as memory 506. Transmission media include coaxial cables, copper wire, and fiber optics, including the wires that comprise bus 508. Transmission media can also take the form of acoustic or light waves, such as those generated during radio frequency and infrared data communications. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, a carrier wave, or any other medium from which a computer can read.

Those of skill in the art would appreciate that the various illustrative blocks, modules, elements, components, methods, and algorithms described herein may be implemented as electronic hardware, computer software, or combinations of both. Furthermore, these may be partitioned differently than what is described. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application.

It is understood that the specific order or hierarchy of steps or blocks in the processes disclosed is an illustration of exemplary approaches. Based upon design preferences, it is understood that the specific order or hierarchy of steps or blocks in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A system for determining membership in a group of notification recipients and issuing a notification to the group of notification recipients, comprising:
    a recipient module configured to store information regarding a set of potential recipients of notifications;
    a tagging module configured to associate the potential recipients with at least one descriptor comprising an indicator of a gender, grade level, geographical location, educational institution, language, age, physical characteristic, academic characteristic, employment characteristic, political characteristic, performance information, or course information;
    a grouping module configured to dynamically form a group of recipients to receive at least one notification based on the descriptors currently associated with the set of potential recipients of notifications, wherein dynamic formation of the group of recipients includes changing membership in the group of recipients in response to a change in the descriptors associated with the set of potential recipients of notifications; and
    a transmission module configured to transmit the at least one notification to the group of recipients.

2. A system for determining membership in a group of notification recipients and issuing a notification to the group of notification recipients, comprising:
    a recipient module configured to store information regarding a set of potential recipients of notifications;
    a tagging module configured to associate the potential recipients with at least one descriptor comprising an indicator of a gender, grade level, geographical location, educational institution, language, age, physical characteristic, academic characteristic, employment characteristic, political characteristic, performance information, or course information;
    a grouping module configured to automatically update, in response to a change in the descriptors associated with the set of potential recipients of notifications, a group of recipients to receive at least one notification based on the descriptors currently associated with the set of potential recipients of notifications, wherein the group of recipients is automatically updated by changing membership in the group of recipients in response to a change in the descriptors associated with the set of potential recipients of notifications; and
    a transmission module configured to transmit the at least one notification to the group of recipients.

3. A method for determining membership in a group of notification recipients and issuing a notification to the group of notification recipients, comprising:
    associating a set of potential recipients of notifications with at least one descriptor comprising an indicator of a gender, grade level, geographical location, educational institution, language, age, physical characteristic, academic characteristic, employment characteristic, political characteristic, performance information, or course information;
    dynamically forming a group of recipients to receive at least one notification based on the descriptors currently associated with the set of potential recipients of notifications, wherein the group of recipients is dynamically formed by changing membership in the group of recipients in response to a change in the descriptors associated with the set of potential recipients of notifications; and
    issuing the at least one notification to the group of recipients.

4. A machine-readable medium encoded with instructions for determining membership in a group of notification recipients and issuing a notification to the group of notification recipients, the instructions comprising code for:
    associating a set of potential recipients of notifications with at least one descriptor comprising an indicator of a gender, grade level, geographical location, educational institution, language, age, physical characteristic, academic characteristic, employment characteristic, political characteristic, performance information, or course information;
    dynamically forming a group of recipients to receive at least one notification based on the descriptors currently associated with the set of potential recipients of notifications, wherein the group of recipients is dynamically formed by changing membership in the group of recipients in response to a change in the descriptors associated with the set of potential recipients of notifications; and
    issuing the at least one notification to the group of recipients.

5. A system for determining membership in a group of notification recipients and issuing a notification to the group of notification recipients, comprising:
    means for associating a set of potential recipients of notifications with at least one descriptor comprising an indicator of a gender, grade level, geographical location, educational institution, language, age, physical characteristic, academic characteristic, employment characteristic, political characteristic, performance information, or course information;
    means for dynamically forming a group of recipients to receive at least one notification based on the descriptors currently associated with the set of potential recipients of notifications, wherein the group of recipients is dynamically formed by changing membership in the group of recipients in response to a change in the descriptors associated with the set of potential recipients of notifications; and
    means for issuing the at least one notification to the group of recipients.

6. The system of claim 1, wherein:
    the recipient module further comprises another set of potential recipients;
    the tagging module is further configured to associate the another set of potential recipients with another descriptor;
    the grouping module is further configured to dynamically form a second group of recipients to receive the at least one notification based on the descriptors currently associated with the another set of potential recipients of notifications, such that membership in the second group of recipients is changeable in response to a change in the descriptors associated with the another set of potential recipients of notifications; and
    a transmission module configured to transmit the at least one notification to the second group of recipients.

7. The system of claim 6, wherein at least one of the descriptors associated with the group of recipients and at least one of the descriptors associated with the second group of recipients is the same.

8. The system of claim 6, wherein at least one of the descriptors associated with the group of recipients and at least one of the descriptors associated with the second group of recipients is different.

9. The system of claim 1, further comprising a display module configured to display an indicator of at least one of the set of potential recipients and the group of recipients to receive the at least one notification.

10. A system for determining membership in a group of notification recipients and issuing a notification to the group of notification recipients, comprising:
a recipient module configured to store information regarding a set of potential recipients of notifications;
a tagging module configured to associate the potential recipients with at least one descriptor;
a grouping module configured to automatically update, in response to a change in the descriptors associated with the set of potential recipients of notifications, a group of recipients to receive at least one notification based on the descriptors currently associated with the set of potential recipients of notifications; and
a transmission module configured to transmit the at least one notification to the group of recipients,
wherein the at least one descriptor comprises an indicator of a gender, grade level, geographical location, educational institution, language, age, physical characteristic, academic characteristic, employment characteristic, political characteristic, performance information, or course information.

11. A method for determining membership in a group of notification recipients and issuing a notification to the group of notification recipients, comprising:
associating a set of potential recipients of notifications with at least one descriptor;
dynamically forming a group of recipients to receive at least one notification based on the descriptors currently associated with the set of potential recipients of notifications; and
issuing the at least one notification to the group of recipients,
wherein the at least one descriptor comprises an indicator of a gender, grade level, geographical location, educational institution, language, age, physical characteristic, academic characteristic, employment characteristic, political characteristic, performance information, or course information.

12. The method of claim 11, wherein the group of recipients is dynamically formed by changing membership in the group of recipients in response to a change in the descriptors associated with the set of potential recipients of notifications.

13. The method of claim 11, further comprising:
changing membership in the group of recipients in response to a change in the descriptors associated with the set of potential recipients of notifications.

14. The method of claim 11, further comprising:
displaying the group of recipients to receive at least one notification based on the descriptors currently associated with the set of potential recipients of notifications.

15. The method of claim 14, further comprising:
updating the display of the group of recipients to receive at least one notification in response to a change in the descriptors associated with the set of potential recipients of notifications.

16. The method of claim 11, further comprising:
locating, based on the at least one descriptor, at least one recipient from the set of potential recipients.

17. The method of claim 11, further comprising:
locating, based on the at least one descriptor, at least one recipient from the group of recipients.

18. The method of claim 11, further comprising:
associating the potential recipients with another descriptor different than the at least one descriptor.

19. The method of claim 11, further comprising:
associating another set of potential recipients with another descriptor;
dynamically forming a second group of recipients to receive another notification based on the descriptors currently associated with the another set of potential recipients of notifications, such that membership in the second group of recipients is changeable in response to a change in the descriptors associated with the another set of potential recipients of notifications; and
issuing the other notification to the second group of recipients.

20. A machine-readable medium encoded with instructions for determining membership in a group of notification recipients and issuing a notification to the group of notification recipients, the instructions comprising code for:
associating a set of potential recipients of notifications with at least one descriptor;
dynamically forming a group of recipients to receive at least one notification based on the descriptors currently associated with the set of potential recipients of notifications; and
issuing the at least one notification to the group of recipients,
wherein the at least one descriptor comprises an indicator of a gender, grade level, geographical location, educational institution, language, age, physical characteristic, academic characteristic, employment characteristic, political characteristic, performance information, or course information.

21. A system for determining membership in a group of notification recipients and issuing a notification to the group of notification recipients, comprising:
means for associating a set of potential recipients of notifications with at least one descriptor;
means for dynamically forming a group of recipients to receive at least one notification based on the descriptors currently associated with the set of potential recipients of notifications; and
means for issuing the at least one notification to the group of recipients,
wherein the at least one descriptor comprises an indicator of a gender, grade level, geographical location, educational institution, language, age, physical characteristic, academic characteristic, employment characteristic, political characteristic, performance information, or course information.

* * * * *